US012785145B2

(12) United States Patent
Cho et al.

(10) Patent No.: US 12,785,145 B2
(45) Date of Patent: Nov. 3, 2026

(54) NON-AQUEOUS ELECTROLYTE AND LITHIUM SECONDARY BATTERY INCLUDING THE SAME

(71) Applicants: SK ON CO., LTD., Seoul (KR); SK INNOVATION CO., LTD., Seoul (KR)

(72) Inventors: In Haeng Cho, Daejeon (KR); Sang Hye Shin, Daejeon (KR); Min Young Lee, Daejeon (KR); Jin Hong Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 893 days.

(21) Appl. No.: 18/086,327

(22) Filed: Dec. 21, 2022

(65) Prior Publication Data

US 2023/0198020 A1 Jun. 22, 2023

(30) Foreign Application Priority Data

Dec. 21, 2021 (KR) ........................ 10-2021-0183909

(51) Int. Cl.
*H01M 10/0567* (2010.01)
*H01M 10/0568* (2010.01)
*H01M 10/0569* (2010.01)

(52) U.S. Cl.
CPC ... *H01M 10/0567* (2013.01); *H01M 10/0568* (2013.01); *H01M 10/0569* (2013.01); *H01M 2300/0037* (2013.01)

(58) Field of Classification Search
CPC ......... H01M 10/0567; H01M 10/0568; H01M 10/0569; H01M 2300/0037
USPC .......................................... 429/332; 502/150
See application file for complete search history.

(56) References Cited

U.S. PATENT DOCUMENTS

2002/0037458 A1* 3/2002 Yamaguchi ....... H01M 10/0567 429/339
2011/0311886 A1* 12/2011 Funada ............ H01M 10/0567 429/342
2019/0067731 A1* 2/2019 Kashiwazaki ...... H01M 50/491
2020/0036040 A1* 1/2020 Takai .................... H01M 4/485
2024/0055658 A1* 2/2024 Li ......................... H01M 4/525

FOREIGN PATENT DOCUMENTS

CN 103985904 A * 8/2014 ........ H01M 10/0525
CN 104332654 A * 2/2015 ........ H01M 10/0567
CN 107154519 A * 9/2017 ............ H01M 10/08
CN 106299507 B * 9/2018 .......... H01M 10/443
JP 2003168474 A * 6/2003 ............ H01M 10/05
JP 2004055230 A * 2/2004 ............ H01M 10/05
JP 2008-34233 A 2/2008
JP 2008034233 A * 2/2008 ............ H01M 10/05
KR 2001-0107665 A 12/2001
KR 10-2019-0119615 A 10/2019

* cited by examiner

*Primary Examiner* — Patricia L. Hailey
(74) *Attorney, Agent, or Firm* — IP&T GROUP LLP

(57) ABSTRACT

A non-aqueous electrolyte and a lithium secondary battery including the same are provided. The non-aqueous electrolyte includes a non-aqueous organic solvent, a lithium salt, an additive represented by Chemical Formula 1 or Chemical Formula 2, and an auxiliary additive including a carbonate-based compound. A content of the additive relative to a weight of the carbonate-based compound is in a range from 10 wt % to 50 wt %. Capacity properties at low temperature and lifespan properties at high temperature may be improved.

7 Claims, 2 Drawing Sheets

NON-AQUEOUS ELECTROLYTE AND LITHIUM SECONDARY BATTERY INCLUDING THE SAME

CROSS-REFERENCE TO RELATED APPLICATION AND CLAIM OF PRIORITY

This application claims priority to Korean Patent Applications No. 10-2021-0183909 filed on Dec. 21, 2021 in the Korean Intellectual Property Office (KIPO), the entire disclosure of which is incorporated by reference herein.

BACKGROUND

1. Field

The present invention relates to a non-aqueous electrolyte and a lithium secondary battery including the same. More particularly, the present invention relates to a non-aqueous electrolyte including a non-aqueous solvent and an additive, and a lithium secondary battery including the same.

2. Description of the Related Art

A secondary battery which can be charged and discharged repeatedly has been widely employed as a power source of a mobile electronic device such as a camcorder, a mobile phone, a laptop computer. Recently, a battery pack including the secondary battery is being developed and applied as a power source of an eco-friendly automobile such as a hybrid vehicle.

A lithium secondary battery is highlighted and developed among various types of secondary batteries due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

A lithium metal oxide may be used as an active material for a cathode of a lithium secondary battery. Examples of the lithium metal oxide include a nickel-based lithium metal oxide.

As an application range of the lithium secondary batteries is expanded, enhanced life-span, and higher capacity and operational stability are required. Accordingly, a lithium secondary battery that provides uniform power and capacity even during repeated charging and discharging is preferable.

However, power and capacity may be decreased due to surface damages of the nickel-based lithium metal oxide used as the cathode active material, and side reactions between the nickel-based lithium metal oxide and the electrolyte may occur.

For example, as disclosed in Korean Published Patent Application No. 10-2019-0119615, etc., a method for improving battery properties by adding additives to a non-aqueous electrolyte for a lithium secondary battery is being researched.

SUMMARY

According to an aspect of the present invention, there is provided a non-aqueous electrolyte providing improved mechanical and chemical stability.

According to an aspect of the present invention, there is provided a lithium secondary including the non-aqueous electrolyte and having improved operational stability and electrical property.

A non-aqueous electrolyte includes a non-aqueous organic solvent, a lithium salt, an additive represented by Chemical Formula 1 or Chemical Formula 2, and an auxiliary additive including a carbonate-based compound. A content of the additive relative to a weight of the carbonate-based compound is in a range from 10 wt % to 50 wt %.

[Chemical Formula 1]

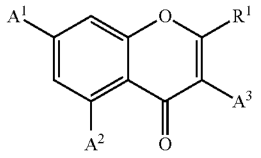

[Chemical Formula 2]

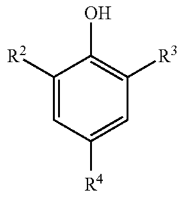

In Chemical Formulae 1 and 2, $R^1$ to $R^4$ are each independently a hydrocarbon containing a substituted or unsubstituted $C_1$-$C_6$ alkyl group, or a substituted or unsubstituted $C_6$-$C_{12}$ aryl group, and $A^1$ to $A^3$ are each independently hydrogen or a hydroxyl group.

In some embodiments, the additive may be represented by Chemical Formula 3.

[Chemical Formula 3]

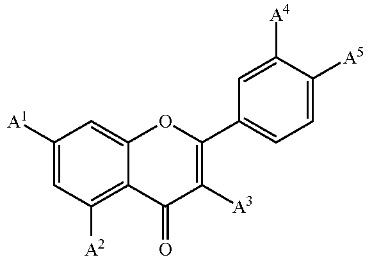

In Chemical Formula 3, $A^1$ to $A^5$ may each independently be hydrogen or a hydroxyl group.

In some embodiments, the additive may be represented by Chemical Formula 4.

[Chemical Formula 4]

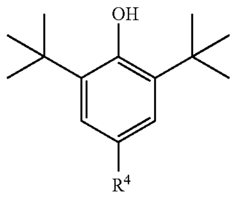

In Chemical Formula 4, $R^4$ may be a hydrocarbon containing a substituted or unsubstituted $C_1$-$C_6$ alkyl group, or a substituted or unsubstituted $C_6$-$C_{12}$ aryl group.

In some embodiments, the auxiliary additive may further include a sultone-based compound including an alkyl sultone-based compound and an alkenyl sultone-based compound.

In some embodiments, a content of the additive relative to a weight of the alkyl sultone-based compound may be in a range from 20 wt % to 100 wt %.

In some embodiments, a content of the additive relative to a weight of the alkenyl sultone-based compound may be in a range from 20 wt % to 170 wt %.

In some embodiments, a content of the additive relative to a total weight of the non-aqueous electrolyte may be in a range from 0.1 wt % to 0.5 wt %.

In some embodiments, the non-aqueous organic solvent may include at least one of ethylene carbonate (EC), ethyl methyl carbonate (EMC), dimethyl carbonate (DMC) and diethyl carbonate (DEC).

In some embodiments, the lithium salt may include at least one of lithium tetrafluoroborate ($LiBF_4$), lithium hexafluorophosphate ($LiPF_6$) and lithium difluorophosphate ($LiPO_2F_2$).

A lithium secondary battery includes a cathode, an anode facing the cathode and the non-aqueous electrolyte according to embodiments as described above.

A non-aqueous electrolyte according to exemplary embodiments includes an additive represented by Chemical Formula 1 or Chemical Formula 2. In this case, the additive may function as a radical scavenger. Accordingly, a lithium-ion transfer may be facilitated, and a swelling phenomenon at high temperature may be suppressed to improve high-temperature life-span properties.

In exemplary embodiments, the non-aqueous electrolyte may include an auxiliary additive including a carbonate-based compound, and the additive may be included in a weight ratio within a predetermined range with respect to compounds included in the auxiliary additive. In this case, an excessive resistance increase of the battery may be prevented while improving low-temperature capacity properties and high-temperature storage properties.

DETAILED DESCRIPTION OF THE EMBODIMENTS

Figure 1:
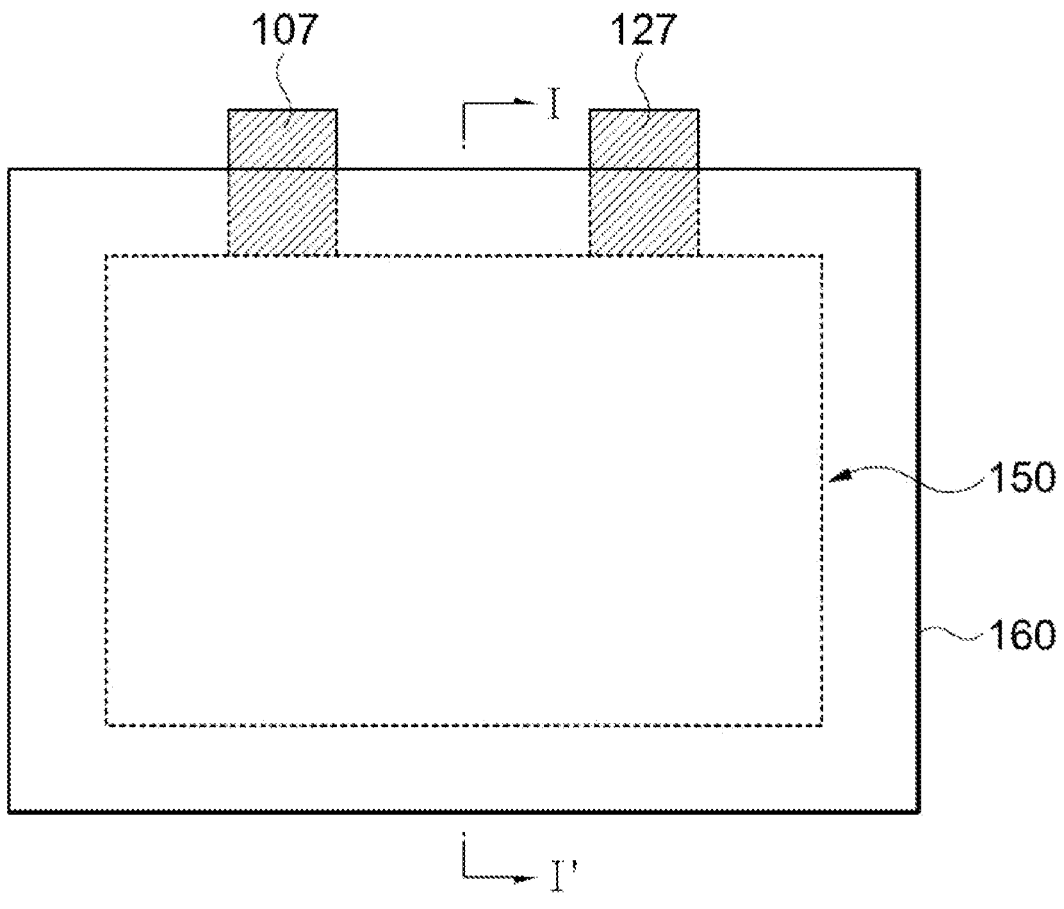
FIGS. 1 and 2 are a schematic plan view and a schematic cross-sectional view, respectively, illustrating a lithium secondary battery in accordance with exemplary embodiments.

According to embodiments of the present invention, a non-aqueous electrolyte including an organic solvent, a lithium salt, an additive and an auxiliary additive is provided. According to embodiments of the present invention, a lithium secondary battery including the non-aqueous electrolyte and having improved low-temperature capacity properties and high-temperature life-span properties is also provided.

In exemplary embodiments, the non-aqueous electrolyte may include a non-aqueous organic solvent, a lithium salt, an additive and an auxiliary additive.

For example, the non-aqueous organic solvent may include an organic compound that may provide sufficient solubility for the lithium salt, the additive and the auxiliary additive and may not have a reactivity with the lithium secondary battery.

In exemplary embodiments, the organic solvent may include a carbonate-based solvent, an ester-based solvent, an ether-based solvent, a ketone-based solvent, an alcohol-based solvent, an aprotic solvent, etc. These may be used alone or in a combination thereof.

For example, the carbonate-based solvent may include at least one of dimethyl carbonate (DMC), ethyl methyl carbonate (EMC), methyl propyl carbonate, ethyl propyl carbonate, diethyl carbonate (DEC), dipropyl carbonate, propylene carbonate (PC), ethylene carbonate (EC), fluoroethylene carbonate (FEC) and butylene carbonate.

For example, the ester-based solvent may include at least one of methyl acetate (MA), ethyl acetate (EA), n-propyl acetate (n-PA), 1,1-dimethylethyl acetate (DMEA), methyl propionate (MP), ethyl propionate (EP), γ-butyrolacton (GBL), decanolide, valerolactone, mevalonolactone and caprolactone, etc.

For example, the ether-based solvent may include at least one of dibutyl ether, tetraethylene glycol dimethyl ether (TEGDME), diethylene glycol dimethyl ether (DEGDME), dimethoxyethane, tetrahydrofuran (THF) and 2-methyltetrahydrofuran.

For example, the ketone-based solvent may include cyclohexanone, etc.

For example, the alcohol-based solvent may include at least one of ethyl alcohol and isopropyl alcohol.

For example, the aprotic solvent may include at least one of a nitrile-based solvent, an amide-based solvent (e.g., dimethylformamide), a dioxolane-based solvent (e.g., 1,3-dioxolane) and a sulfolane-based solvent.

In some embodiments, the organic solvent may include the carbonate-based solvent, and the carbonate-based solvent may include at least one of ethylene carbonate (EC), ethylmethyl carbonate (EMC), dimethyl carbonate (DMC) and diethyl carbonate (DEC).

In exemplary embodiments, a lithium salt may be provided as an electrolyte. For example, the lithium salt may be expressed as $Li^+X^-$.

For example, the anion $X^-$ may be $F^-$, $Cl^-$, $Br^-$, $I^-$, $NO_3^-$, $N(CN)_2^-$, $BF_4^-$, $ClO_4^-$, $PF_6^-$, $SbF_6^-$, $AsF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N$ $CF_3CF_2(CF_3)_2CO$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N$ and $PO_2F_2^-$. These may be used alone or in a combination thereof.

In some embodiments, the lithium salt may include at least one of $LiBF_4$, $LiPF_6$, and $LiPO_2F_2$. In this case, a film having improved thermal stability may be formed on a surface of the electrode. Accordingly, improved ion conductivity and electrode protection properties of the non-aqueous electrolyte may be implemented.

In an embodiment, the lithium salt may be included in a concentration from about 0.01 to 5M, preferably from about 0.01 to 2M with respect to the non-aqueous organic solvent. Within the above range, transfer of lithium ions and/or electrons may be promoted during charging and discharging of the lithium secondary battery, so that improved capacity may be achieved.

In exemplary embodiments, the additive may be represented by Chemical Formula 1 or Chemical Formula 2 below.

[Chemical Formula 1]

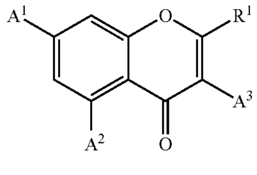

-continued

[Chemical Formula 2]

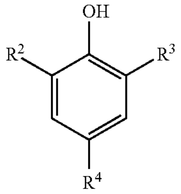

In Chemical Formulae 1 and 2, $R^1$ to $R^4$ may each independently be a hydrocarbon containing a substituted or unsubstituted $C_1$-$C_6$ alkyl group or a substituted or unsubstituted $C_6$-$C_{12}$ aryl group. $A^1$ to $A^3$ may each independently be hydrogen or a hydroxyl group.

As used herein, the term "hydrocarbon" may include a cyclic aliphatic group, a linear aliphatic group, an aromatic group or a combination thereof.

In some embodiments, $R^1$ may be a substituted or unsubstituted $C_6$-$C_{12}$ aryl group, and $R^2$ to $R^4$ may each independently be a substituted or unsubstituted $C_1$-$C_6$ alkyl group.

For example, a substituent included in $R^1$ to $R^4$ may include at least one selected from the group consisting of a halogen, a $C_1$-$C_6$ alkyl group, a $C_3$-$C_6$ cycloalkyl group, a $C_1$-$C_6$ alkoxy group, a 3 to 7 membered hetero cycloalkyl group, a $C_6$-$C_{12}$ aryl group, a 5 to 7 membered heteroaryl group, a hydroxyl group(—OH), $—NR^5R^6$ ($R^5$ and $R^6$ are each independently hydrogen or a $C_1$-$C_6$ alkyl group), a nitro group ($—NO_2$) and a cyano group (—CN).

For example, a thickness of the battery may be increased due to a swelling phenomenon while being stored at high temperature. In this case, durability and stability of the secondary battery may be deteriorated. For example, mobility of lithium ions may be lowered while being stored at low temperature, and capacity properties may be degraded.

However, according to exemplary embodiments of the present invention, the additive represented by Chemical Formula 1 or Chemical Formula 2 may serve as a radical scavenger in the non-aqueous electrolyte. In this case, an active radical (e.g., an active oxygen) generated around the cathode active material may be captured and removed. Accordingly, the capacity properties of the battery at low temperature (e.g., −5° C. or less) may be improved, and lifespan properties of the battery during the storage at high temperature (e.g., 45° C. or higher) may be improved.

In some embodiments, the additive may be represented by Chemical Formula 3 below.

[Chemical Formula 3]

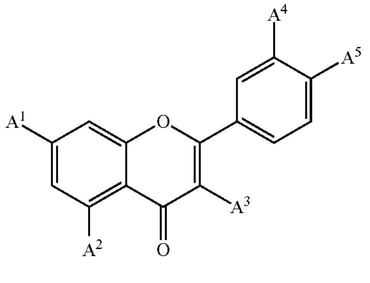

In Chemical Formula 3, $A^1$ to $A^5$ may each independently represent hydrogen or a hydroxyl group.

For example, the additive may be a flavonoid-based compound, preferably quercetin.

In some embodiments, the additive may be represented by Chemical Formula 4 below.

[Chemical Formula 4]

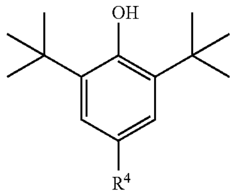

In Chemical Formula 4, $R^4$ may be a hydrocarbon containing a substituted or unsubstituted $C_1$-$C_6$ alkyl group or a substituted or unsubstituted $C_6$-$C_{12}$ aryl group.

For example, $R^4$ in Chemical Formula 4 may be a methyl group.

When the additive includes a compound represented by Chemical Formula 3 or Chemical Formula 4 described above, the active oxygen removal may be promoted, and thus high-temperature life-span properties of the secondary battery may be improved. Further, mobility of the lithium ions at low temperature may also be enhanced to improve capacity properties.

In exemplary embodiments, the above-described non-aqueous electrolyte may include an auxiliary additive including a carbonate-based compound.

The carbonate-based compound may include, e.g., at least one of vinylene carbonate (VC), vinylethylene carbonate (VEC) and fluoroethylene carbonate (FEC).

In exemplary embodiments, a content of the additive relative to a weight of the carbonate-based compound included in the auxiliary additive may be in a range from 10 wt % to 50 wt %.

If the content of the additive is less than 10 wt % relative to the weight of the carbonate-based compound, the content of the additive becomes low, and the life-span properties of the battery during the high-temperature storage may be deteriorated.

If the content of the additive exceeds 50 wt % relative to the weight of the carbonate-based compound, a resistance of the battery may be increased to cause deterioration of capacity and power properties.

In some embodiments, the auxiliary additive may further include a sultone-based compound including an alkyl sultone-based compound and an alkenyl sultone-based compound.

For example, the alkyl sultone-based compound may include at least one of 1,3-propane sultone (PS) and 1,4-butane sultone.

For example, the alkenyl sultone-based compound may include at least one of ethensultone, 1,3-propene sultone (PRS), 1,4-butene sultone and 1-methyl-1,3-propene sultone.

In some embodiments, a content of the above-described additive relative to a weight of the alkyl sultone-based compound included in the auxiliary additive may be in a range from 20 wt % to 100 wt %. In this case, the above-described radical scavenging capability and mobility in the non-aqueous electrolyte may not be hindered. Accordingly, capacity retention at room temperature and storage properties at high temperature of the lithium secondary battery may be improved.

In some embodiments, the content of the above-described additive relative to a weight of the alkenyl sultone-based compound included in the auxiliary additive may be in a range from 20 wt % to 170 wt %. In this case, the above-described radical scavenging capability and mobility in the non-aqueous electrolyte may not be hindered.

Accordingly, capacity retention at room temperature and storage properties at high temperature of the lithium secondary battery may be improved.

The above-described auxiliary additives may further include an anhydride-based compound such as succinic anhydride and maleic anhydride, a nitrile-based compound such as glutaronitrile, succinonitrile and adiponitrile. These may be used alone or in a combination thereof in addition to the above-mentioned carbonate-based compound and the sultone-based compound.

In some embodiments, a content of the additive relative to a total weight of the non-aqueous electrolyte may be in a range from 0.1 wt % to 0.5 wt %. In this case, radical scavenging capability may be sufficiently implemented while preventing an increase of the battery resistance. Thus, the improved capacity retention at room temperature and storage properties at high temperature may be implemented.

A lithium secondary battery according to exemplary embodiments of the present invention may include a cathode, an anode facing the cathode and the above-described non-aqueous electrolyte.

Figure 2:
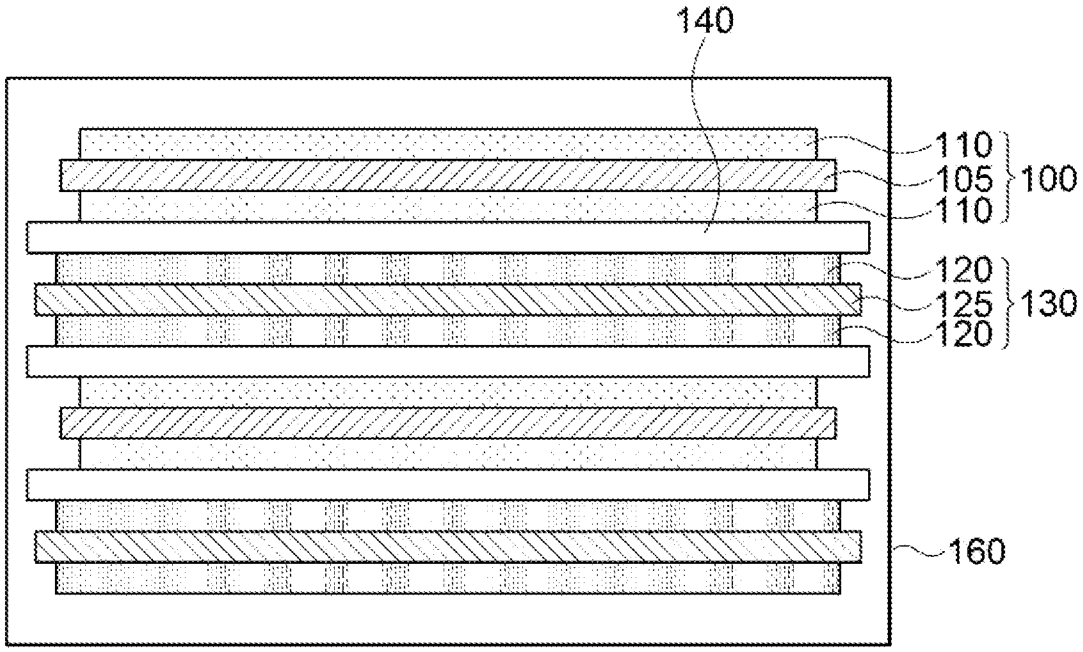

FIGS. 1 and 2 are a schematic plan view and a schematic cross-sectional view, respectively, illustrating a lithium secondary battery in accordance with exemplary embodiments. For example, FIG. 2 is a cross-sectional view taken along line I-I' of FIG. 1.

Referring to FIGS. 1 and 2, a lithium secondary battery may include a cathode 100 and an anode 130 facing the cathode 100.

The cathode 100 may include a cathode current collector 105 and a cathode active material layer 110 formed on the cathode current collector 105.

For example, the cathode active material layer 110 may include a cathode active material and a binder, and may further include a conductive material.

For example, a cathode slurry may be prepared by mixing and stirring the cathode active material in a solvent with the cathode binder, the conductive material, a dispersive agent, etc. The cathode slurry may be coated on the cathode current collector 105, and then dried and pressed to form the cathode 100.

The cathode current collector 105 may include stainless-steel, nickel, aluminum, titanium, copper or an alloy thereof. Preferably, aluminum or an alloy thereof may be used.

The cathode active material may include a lithium metal oxide particle capable of reversibly intercalating and de-intercalating lithium ions. The cathode active material may include, e.g., a lithium metal oxide containing a metal element such as nickel, cobalt, manganese, aluminum, etc.

For example, the lithium metal oxide may be represented by Chemical Formula 5 below.

$$Li_aNi_xM_{1-x}O_{2+y} \quad \text{[Chemical Formula 5]}$$

In Chemical Formula 1,$0.9 \leq a \leq 1.2$, $0.5 \leq x \leq 0.99$, $-0.1 \leq y \leq 0.1$, and M may include at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn, Ba and Zr.

As a content of Ni in the cathode active material or the lithium metal oxide is increased, chemical stability and high-temperature storage stability of the secondary battery may be relatively deteriorated. Further, surface damages of the cathode active material or a side reaction with the non-aqueous electrolyte due to repeated charge/discharge cycles may be caused, and high power/high capacity properties from the high-Ni content may not be sufficiently implemented.

However, as described above, the additive having the predetermined chemical structure may capture/remove active oxygen around the cathode active material or in the non-aqueous electrolyte. Accordingly, high power/high capacity properties from the high-Ni content (e.g., 80 mol % or more of Ni) may be substantially uniformly maintained for a long period even in a high temperature environment.

For example, the binder may include an organic based binder such as polyvinylidenefluoride (PVDF), a polyvinylidene fluoride-hexafluoropropylene copolymer (PVDF-co-HFP), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on the anode current collector 125.

The anode active material may include a widely known material in the related art which may be capable of adsorbing and ejecting lithium ions. For example, the anode active material may include a carbon-based material such as a crystalline carbon, an amorphous carbon, a carbon complex, a carbon fiber, etc., a lithium alloy, a silicon-based material, tin, etc.

The amorphous carbon may include, e.g., a hard carbon, cokes, a mesocarbon microbead (MCMB), a mesophase pitch-based carbon fiber (MPCF), etc.

The crystalline carbon may include, e.g., an artificial graphite, natural graphite, graphitized cokes, graphitized MCMB, graphitized MPCF, etc.

For example, the lithium alloy may include a metal element such as aluminum, zinc, bismuth, cadmium, antimony, silicon, lead, tin, gallium, indium, etc.

The silicon-based compound may include, e.g., silicon oxide, a silicon-carbon composite compound such as silicon carbide (SiC).

For example, the anode active material may be mixed and stirred together with the above-described binder and conductive material, a thickener, etc., in a solvent to form a slurry. The slurry may be coated on at least one surface of the anode current collector 125, dried and pressed to obtain the anode 130.

A separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation.

In exemplary embodiments, an electrode cell may be defined by the cathode 100, the anode 130 and the separation layer 140, and a plurality of the electrode cells may be stacked to form an electrode assembly 150 that may have e.g., a jelly roll shape. For example, the electrode assembly 150 may be formed by winding, laminating or folding the separation layer 140.

The electrode assembly 150 may be accommodated together with the non-aqueous electrolyte according to exemplary embodiments in a case 160 to define the lithium secondary battery. In exemplary embodiments, a non-aqueous electrolyte including the above-described additive and auxiliary additive may be used.

As illustrated in FIG. 1, electrode tabs (a cathode tab and an anode tab) may protrude from the cathode current collector 105 and the anode current collector 125 included in each electrode cell to one side of the case 160. The electrode tabs may be welded together with the one side of the case 160 to be connected to an electrode lead (a cathode lead 107 and an anode lead 127) that may be extended or exposed to an outside of the case 160.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLE 1

(1) Preparation of Non-Aqueous Electrolyte

A 1M $LiPF_6$ solution was prepared using a mixed solvent of EC/EMC (25:75; volume ratio). Quercetin represented by Chemical Formula 6 as an additive was added and mixed to the 1.0M $LiPF_6$ solution with an amount of 0.1 wt % based on a total weight of a non-aqueous electrolyte.

[Chemical Formula 6]

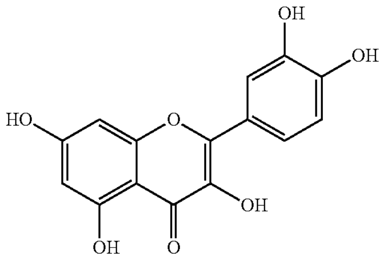

Additionally, 1.0 wt % of fluoroethylene carbonate (FEC), 0.5 wt % of 1,3-propanesultone (PS) and 0.5 wt % of 1,3-propenesultone (PRS) based on the total weight of the non-aqueous electrolyte were added and mixed to the 1.0M $LiPF_6$ solution to prepare the non-aqueous electrolyte.

(2) Fabrication of Lithium Secondary Battery

A slurry was prepared by mixing Li[Ni0.8Co0.1Mn0.11]$O_2$ as a cathode active material, carbon black as a conductive material and polyvinylidene fluoride (PVdF) as a binder in a weight ratio of 92:5:3. The slurry was uniformly coated on an aluminum foil having a thickness of 15 μm and vacuum dried at 130° C. to prepare a cathode for a lithium secondary battery.

An anode slurry containing 95 wt % of natural graphite as an anode active material, 1 wt % of Super-P as a conductive material, 2 wt % of styrene-butadiene rubber (SBR) as a binder and 2 wt % of carboxymethyl cellulose (CMC) as a thickener was prepared. The anode slurry was uniformly coated on a copper foil having a thickness of 15 μm, dried and pressed to form an anode.

The cathode and the anode prepared as described above were each notched by a predetermined size, and stacked with a separator (polyethylene, thickness: 20 μm) interposed therebetween to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions. The non-aqueous electrolyte as prepared in the above (1) was injected through the electrolyte injection side, and then the electrolyte injection side was also sealed. Impregnation was performed for more than 12 hours to obtain a lithium secondary battery.

EXAMPLE 2

A non-aqueous electrolyte and a lithium secondary battery were prepared by the same method as that in Example 1, except that 0.3 wt % of quercetin as the additive was added based on the total weight of the non-aqueous electrolyte when preparing the non-aqueous electrolyte.

EXAMPLE 3

A non-aqueous electrolyte and a lithium secondary battery were prepared by the same method as that in Example 1, except that 0.5 wt % quercetin as the additive and 0.3 wt % of 1,3-propane sultone (PS) were added based on the total weight of the non-aqueous electrolyte when preparing the non-aqueous electrolyte.

EXAMPLE 4

A non-aqueous electrolyte and a lithium secondary battery were prepared by the same method as that in Example 1, 0.6 wt % of 1,3-propane sultone (PS) of the auxiliary additives was added based on the total weight of the non-aqueous electrolyte when preparing the non-aqueous electrolyte.

EXAMPLE 5

A non-aqueous electrolyte and a lithium secondary battery were prepared by the same method as that in Example 3, 0.4 wt % of 1,3-propane sultone (PS) of the auxiliary additives was added based on the total weight of the non-aqueous electrolyte when preparing the non-aqueous electrolyte.

EXAMPLE 6

A non-aqueous electrolyte and a lithium secondary battery were prepared by the same method as that in Example 1, 0.6 wt % of 1,3-propene sultone (PRS) of the auxiliary additives was added based on the total weight of the non-aqueous electrolyte when preparing the non-aqueous electrolyte.

EXAMPLE 7

A non-aqueous electrolyte and a lithium secondary battery were prepared by the same method as that in Example 3, 0.2 wt % of 1,3-propene sultone (PRS) of the auxiliary additives was added based on the total weight of the non-aqueous electrolyte when preparing the non-aqueous electrolyte.

EXAMPLE 8

A non-aqueous electrolyte and a lithium secondary battery were prepared by the same method as that in Example 1, except that 0.08 wt % of quercetin was added, and 0.8 wt % of fluoroethylene carbonate (FEC), 0.4 wt % of 1,3-propane sultone (PS) and 0.4 wt % of 1,3-propene sultone (PRS) were added as the auxiliary additives based on the total weight of the non-aqueous electrolyte when preparing the non-aqueous electrolyte.

EXAMPLE 9

A non-aqueous electrolyte and a lithium secondary battery were prepared by the same method as that in Example 1, except that 0.6 wt % of quercetin was added, and 1.2 wt % of fluoroethylene carbonate (FEC), 0.6 wt % of 1,3-propane sultone (PS) and 0.4 wt % of 1,3-propene sultone (PRS) were added as the auxiliary additives based on the total weight of the non-aqueous electrolyte when preparing the non-aqueous electrolyte.

EXAMPLE 10

A non-aqueous electrolyte and a lithium secondary battery were prepared by the same method as that in Example 1, except that butylated hydroxytoluene (BHT) represented by Chemical Formula 7 was added instead of quercetin in an amount of 0.1 wt % based on the total weight of the non-aqueous electrolyte when preparing the non-aqueous electrolyte.

[Chemical Formula 7]

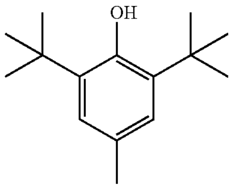

EXAMPLE 11

A non-aqueous electrolyte and a lithium secondary battery were prepared by the same method as that in Example 10, except that 0.3 wt % of butylated hydroxytoluene (BHT) was added based on the total weight of the non-aqueous electrolyte when preparing the non-aqueous electrolyte.

EXAMPLE 12

A non-aqueous electrolyte and a lithium secondary battery were prepared by the same method as that in Example 10, except that 0.5 wt % of butylated hydroxytoluene (BHT) was added based on the total weight of the non-aqueous electrolyte when preparing the non-aqueous electrolyte.

COMPARATIVE EXAMPLE 1

A non-aqueous electrolyte and a lithium secondary battery were prepared by the same method as that in Example 1, except that quercetin was not added when preparing the non-aqueous electrolyte.

COMPARATIVE EXAMPLE 2

A non-aqueous electrolyte and a lithium secondary battery were prepared by the same method as that in Example 1, except that fluoroethylene carbonate (FEC) among the auxiliary additives was added in an amount of 1.1 wt % based on the total weight of the non-aqueous electrolyte when preparing the non-aqueous electrolyte.

COMPARATIVE EXAMPLE 3

A non-aqueous electrolyte and a lithium secondary battery were prepared by the same method as that in Example 3, except that fluoroethylene carbonate (FEC) among the auxiliary additives was added in an amount of 0.9 wt % based on the total weight of the non-aqueous electrolyte when preparing the non-aqueous electrolyte.

The types and contents of the additives and auxiliary additives used in the above-described Examples and Comparative Examples are shown in Table 1 below.

TABLE 1

| No. | additive | contents of additive (wt %) | content of auxiliary additive (wt %) FEC | PS | PRS |
|---|---|---|---|---|---|
| Example 1 | quercetin | 0.1 | 1.0 | 0.5 | 0.5 |
| Example 2 | quercetin | 0.3 | 1.0 | 0.5 | 0.5 |
| Example 3 | quercetin | 0.5 | 1.0 | 0.3 | 0.5 |
| Example 4 | quercetin | 0.1 | 1.0 | 0.6 | 0.5 |
| Example 5 | quercetin | 0.5 | 1.0 | 0.4 | 0.3 |
| Example 6 | quercetin | 0.1 | 1.0 | 0.5 | 0.6 |
| Example 7 | quercetin | 0.5 | 1.0 | 0.3 | 0.2 |
| Example 8 | quercetin | 0.08 | 0.8 | 0.4 | 0.4 |
| Example 9 | quercetin | 0.6 | 1.2 | 0.6 | 0.4 |
| Example 10 | BHT | 0.1 | 1.0 | 0.5 | 0.5 |
| Example 11 | BHT | 0.3 | 1.0 | 0.5 | 0.5 |
| Example 12 | BHT | 0.5 | 1.0 | 0.5 | 0.5 |
| Comparative Example 1 | — | — | 1.0 | 0.5 | 0.5 |
| Comparative Example 2 | quercetin | 0.1 | 1.1 | 0.5 | 0.5 |
| Comparative Example 3 | quercetin | 0.5 | 0.9 | 0.3 | 0.5 |

EXPERIMENTAL EXAMPLE (1) Evaluation on Capacity Property at Low Temperature

The lithium secondary batteries of Examples and Comparative Examples were charged (CC-CV 1.0 C 4.2V 0.05C CUT-OFF) and discharged (CC 1.0C 3.0V CUT-OFF) once at −10° C. to measure a charge capacity and a discharge capacity.

(2) Evaluation on High Temperature Storage Characteristics

The lithium secondary batteries according to the above-described Examples and Comparative Examples were stored in a 60° C. chamber for 12 weeks, and then the following evaluations were performed.

1) Measurement of Battery Thickness

The thickness of the lithium secondary battery was measured using a plate thickness measuring device (Mitutoyo Co., Ltd., 543-490B).

2) Evaluation on Discharge DCIR

C-rates were increased or decreased sequentially as 0.2C, 0.5C, 1.0C, 1.5C, 2.0C, 2.5C and 3.0C at the point where an SOC (State of Charge) of the lithium secondary battery was set to 60%. When the charging and discharging of the corresponding C-rate was performed for 10 seconds, an end point of a voltage was estimated by an equation of a straight line, and a slope was adopted as a DCIR (Direct Current Internal Resistance).

3) Evaluation on Capacity Recovery

Before storing the lithium secondary batteries according to the above-described Examples and Comparative Examples in a chamber at 60° C., charge (CC-CV 1.0 C 4.2V 0.05C CUT-OFF) and discharge (CC 1.0 C 3.0V CUT-OFF) were performed at room temperature (25° C.) once to measure an initial discharge capacity.

Thereafter, the lithium secondary batteries were left in a chamber at 60° C. for 12 weeks, and then discharged once (CC 1.0C 3.0V CUT-OFF). Subsequently, the lithium secondary batteries were charged (CC-CV 1.0 C 4.2V 0.05C CUT-OFF) and discharged (CC 1.0C 3.0V CUT-OFF) once to measure a discharge capacity.

A capacity recovery ratio was calculated as a percentage by dividing the discharge capacity by the initial discharge capacity.

Capacity recovery ratio(%)=(discharge capacity after high temperature storage/initial discharge capacity)*100

The evaluation results are shown in Table 2 below.

TABLE 2

| No. | capacity property at low temperature (−10° C.) charge capacity (mAh) | capacity property at low temperature (−10° C.) discharge capacity (mAh) | high temperature (60° C.) storage property thickness (mm) | high temperature (60° C.) storage property DCIR (mΩ) | high temperature (60° C.) storage property capacity recovery (%) |
|---|---|---|---|---|---|
| Example 1 | 1,276 | 1,250 | 6.41 | 52.8 | 95 |
| Example 2 | 1,285 | 1,264 | 6.25 | 53.1 | 96 |
| Example 3 | 1,298 | 1,280 | 6.08 | 53.6 | 96 |
| Example 4 | 1,271 | 1,248 | 6.50 | 52.7 | 91 |
| Example 5 | 1,302 | 1,283 | 6.01 | 54.2 | 92 |
| Example 6 | 1,275 | 1,258 | 6.48 | 52.5 | 91 |
| Example 7 | 1,306 | 1,289 | 5.98 | 53.8 | 91 |
| Example 8 | 1,283 | 1,263 | 6.51 | 51.2 | 85 |
| Example 9 | 1,316 | 1,297 | 5.81 | 52.9 | 90 |
| Example 10 | 1,299 | 1,278 | 5.97 | 45.8 | 95 |
| Example 11 | 1,306 | 1,287 | 5.78 | 48.3 | 95 |
| Example 12 | 1,317 | 1,305 | 5.65 | 52.8 | 95 |
| Comparative Example 1 | 1,282 | 1,259 | 6.59 | 53.9 | 78 |
| Comparative Example 2 | 1,269 | 1,247 | 6.41 | 54.1 | 83 |
| Comparative Example 3 | 1,291 | 1,269 | 6.20 | 55.3 | 87 |

Referring to Table 2, in Examples where the additive and the auxiliary additive were added at an appropriate content ratio, improved low-temperature capacity and high-temperature storage properties were obtained compared to those from Comparative Examples.

In Example 4, where the content of the additive relative to a weight of the alkyl sultone-based compound was less than 20 wt %, and in Example 6 where the content of the additive relative to a weight of the alkenyl sultone-based compound was less than 20% by weight, the ratio of the additive relative to the auxiliary additive was small. Accordingly, the low temperature compacity property was degraded, the thickness after the high temperature storage was increased and the capacity recovery ratio was degraded relatively to those from other Examples.

In Example 5 where the content of the additive relative to a weight of the alkyl sultone-based compound exceeded 100 wt %, and in Example 7 where the content of the additive relative to a weight of the alkenyl sultone-based compound exceeded 170 wt %, the ratio of the additive relative to the auxiliary additive was excessively increased. Accordingly, the battery resistance was increased and the capacity recovery ratio was decreased relatively to those from other Examples.

In Example 8 where the content of the additive was less than 0.1 wt %, the low-temperature capacity and high-temperature storage properties were degraded relatively to those from other Examples.

In Example 9 where the content of the additive exceeded 0.5 wt %, the capacity recovery ratio was degraded relatively to those from other Examples.

In Examples 10 to 12 where butylated hydroxytoluene (BHT) was added as the additive, the low-temperature capacity properties were further improved when being compared to those from Examples 1 to 3 having the same contents of the additives.

In Comparative Example 1 where the additive was not included, the low-temperature capacity and high-temperature storage properties were remarkably deteriorated when being compared to those from Examples.

In Comparative Example 2 where the content of the additive relative to a weight of the carbonate-based compound among the auxiliary additives was less than 10 wt %, the low-temperature capacity and high-temperature storage properties were deteriorated because the additive was added too little compared to the auxiliary additive.

In Comparative Example 3 where the content of the additive relative to a weight of the carbonate-based compound exceeded 50 wt %, the low-temperature capacity and high-temperature storage properties were also deteriorated.

What is claimed is:

1. A non-aqueous electrolyte, comprising:

a non-aqueous organic solvent;

a lithium salt;

an additive represented by Chemical Formula 1 or Chemical Formula 2; and an auxiliary additive comprising a carbonate-based compound, wherein a content of the additive relative to a weight of the carbonate-based compound is in a range from 10 wt % to 50 wt %, and wherein the auxiliary additive further comprises a sultone-based compound including an alkyl sultone-based compound and an alkenyl sultone-based compound, wherein a content of the additive relative to a weight of the alkyl sultone-based compound is in a range from 20 wt % to 100 wt %, and wherein a content of the additive relative to a weight of the alkenyl sultone-based compound is in a range from 20 wt % to 170 wt %:

[Chemical Formula 1]

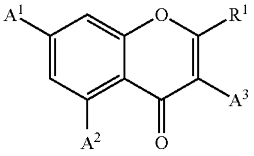

[Chemical Formula 2]

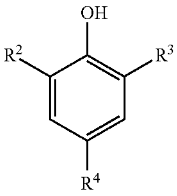

wherein, in Chemical Formulae 1 and 2, $R^1$ to $R^4$ are each independently a hydrocarbon containing a substituted or unsubstituted $C_1$-$C_6$ alkyl group, or a substituted or unsubstituted $C_6$-$C_{12}$ aryl group, and $A^1$ to $A^3$ are each independently hydrogen or a hydroxyl group.

2. The non-aqueous electrolyte according to claim 1, wherein the additive is represented by Chemical Formula 3:

[Chemical Formula 3]

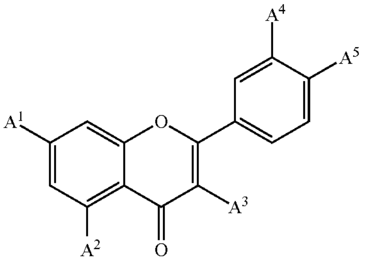

wherein, in Chemical Formula 3, $A^1$ to $A^5$ are each independently hydrogen or a hydroxyl group.

3. The non-aqueous electrolyte according to claim 1, wherein the additive is represented by Chemical Formula 4:

[Chemical Formula 4]

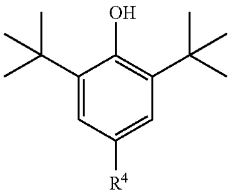

wherein, in Chemical Formula 4, $R^4$ is a hydrocarbon containing a substituted or unsubstituted $C_1$-$C_6$ alkyl group, or a substituted or unsubstituted $C_6$-$C_{12}$ aryl group.

4. The non-aqueous electrolyte according to claim 1, wherein a content of the additive relative to a total weight of the non-aqueous electrolyte is in a range from 0.1 wt % to 0.5 wt %.

5. The non-aqueous electrolyte according to claim 1, wherein the non-aqueous organic solvent includes at least one of ethylene carbonate (EC), ethyl methyl carbonate (EMC), dimethyl carbonate (DMC) and diethyl carbonate (DEC).

6. The non-aqueous electrolyte according to claim 1, wherein the lithium salt includes at least one of lithium tetrafluoroborate ($LiBF_4$), lithium hexafluorophosphate ($LiPF_6$) and lithium difluorophosphate ($LiPO_2F_2$).

7. A lithium secondary battery, comprising:

a cathode;

an anode facing the cathode; and the non-aqueous electrolyte of claim 1.

* * * * *